United States Patent Office 3,424,746
Patented Jan. 28, 1969

3,424,746
STEROIDAL 21-PYRAZOLES AND PROCESS THEREFOR
William P. Schneider, Kalamazoo, Mich., assignor to The Upjohn Company, Kalamazoo, Mich., a corporation of Delaware
No Drawing. Filed Feb. 4, 1966, Ser. No. 525,135
U.S. Cl. 260—239.5      16 Claims
Int. Cl. C07c *173/10*; A61k *17/00*

This invention relates to novel steroid compounds, especially to novel steroid 21-pyrazoles of the formula

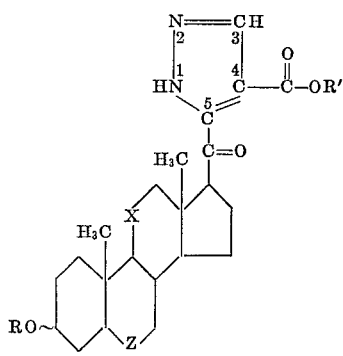

wherein ~ is a generic expression denoting α- and β- bonds and mixtures thereof; R is selected from the group consisting of hydrogen and the acyl radical of a hydrocarbon carboxylic acid containing from one to twelve carbon atoms, inclusive; R' is selected from the group consisting of hydrogen, lower alkyl and pharmacologically acceptable salt cations; X is selected from the group consisting of the methylene radical

the α-hydroxymethylene radical

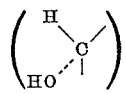

the β-hydroxymethylene radical

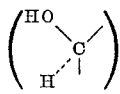

and the carbonyl radical

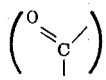

Z is selected from the group consisting of

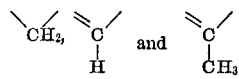

with the proviso that when Z is selected from the group consisting of

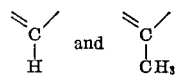

the stereoconfiguration at $C_3$ is β-, but when Z is

the stereoconfiguration at $C_3$ is selected from the group consisting of α- and β-, whereupon the stereoconfiguration of the hydrogen atom at $C_5$ is selected from the group consisting of α- and β-.

The novel compounds of this invention can be represented by a formula wherein the pyrazole moiety can be other than the one above. These pyrazole substituents include:

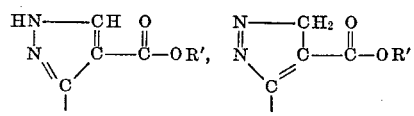

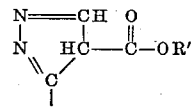

They are tautomeric with the pyrazole structure shown in the generic formula above. Pyrazole tautomerism is a well known phenomenon, as is evident from a discussion of this subject on page 91 of volume 5 of "Heterocyclic Compounds," by Robert C. Elderfield, John Wiley and Sons, Inc., New York, 1957. It is to be understood, therefore, that the novel compounds of the invention are likely to be mixtures of tautomeric forms, the compositions of which are dependent on such factors as the nature of the particular steroidal compound and the environment. In some instances, however, one form or another can predominate. For convenience, reference will be made hereinafter only to the pyrazole moiety set forth in the generic formula of the steroidal compound above.

The novel compounds and process of this invention are illustratively represented by the following sequence of formulae

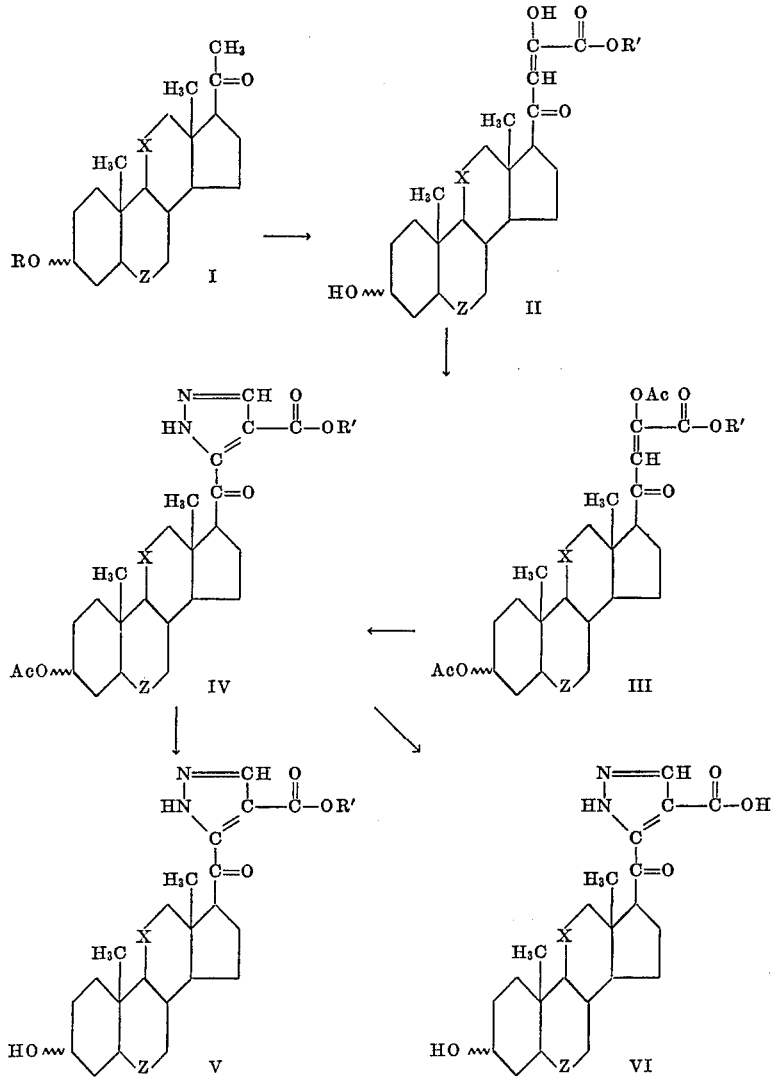

wherein ~ is a generic expression denoting α- and β- bonds and mixtures thereof; Ac is the acyl radical of an organic carboxylic acid containing from one to twelve carbon atoms, inclusive; R is selected from the group consisting of hydrogen and the acyl radical of a hydrocarbon carboxylic acid containing from one to twelve carbon atoms inclusive; R' is selected from the group consisting of hydrogen, lower alkyl and pharmacologically acceptable salt cations, such as $Na^+$, $K^+$ and $NH_4^+$; X is selected from the group consisting of the methylene radical

the α-hydroxymethylene radical

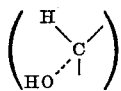

the β-hydroxymethylene radical

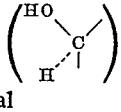

and the carbonyl radical

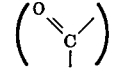

Z is selected from the group consisting of

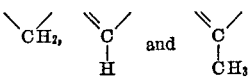

with the proviso that when Z is selected from the group consisting of

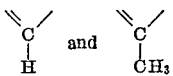

the stereoconfiguration at $C_3$ is β-, but when Z is

the stereoconfiguration at $C_3$ is selected from the group consisting of α- and β-, whereupon the stereoconfiguration of the hydrogen atom at $C_5$ is selected from the group consisting of α- and β-.

The novel compounds embraced by Formulae IV, V and VI of the flowsheet, above, are prepared by the route shown therein, employing the methods and reactions described below.

(1) The first step of the process involves the glyoxalation of the known compounds of Formula I in accordance with the procedure disclosed in Angew. Chem. 60, 247, namely, by treating a compound of the progesterone series [e.g., a 3β-hydroxy-5-pregnene-20-one 3-acylate (I)] with a sodium alkoxide in an alkanol with a dialkyl oxalate to yield a corresponding 21-alkoxyoxalyl compound, e.g., a 21-alkoxyoxalyl-3β-hydroxy-5-pregnen-20-one (II).

(2) Acylation of a thus produced compound of Formula II in the manner described in U.S. Patent 2,740,783 (but employing milder conditions, e.g., heating briefly with an anhydride of an organic carboxylic acid and pyridine) yields a corresponding enol acylate thereof, e.g., an enol acylate of a 21-alkoxyoxalyl-3β-acyloxy-5-pregnen-20-one (III).

(3) Treatment of a compound of Formula III at moderate (room) temperature with diazomethane, preferably in ethereal solution yields a corresponding pyrazole derivative, e.g., a 17β-(4-carboxypyrazol-5-ylcarbonyl)-androst-5-en-3β-ol, acylate, alkyl ester (IV).

(4) Hydrolysis at the 3-position of a thus produced compound of Formula IV, e.g., by refluxing with methanol containing hydrochloric acid (in the manner set forth in Example 5 of U.S. Patent 3,189,623) yields a corresponding 3β-ol, for example, a 17β-(4-carboxypyrazol-5-ylcarbonyl)-androst-5-en-3β-ol, alkyl ester (V).

(5) The conversion of a compound of Formula IV wherein R' is lower alkyl [e.g., a 17β-(4-carboxypyrazol-5-ylcarbonyl)-androst-5-en-3β-ol, acylate, alkyl ester (IV)] to one of Formula VI [e.g., 17β-(4-carboxypyrazol-5-ylcarbonyl)-androst-5-en-3β-ol (VI)] is carried out according to procedures well known in the art (such as those disclosed in J. Amer. Chem. Soc. 77, 4436 or Example 1 of U.S. Patent 3,162,631) by treatment with inorganic bases, for example, alkali-metal hydroxides, e.g., potassium hydroxide or sodium hydroxide, alkali bicarbonates and carbonates, e.g., potassium and sodium bicarbonate and the like, and lithium halides in organic solvents, e.g., lithium iodide in piperidine or collidine. Advantageously the reaction is carried out in an aqueous medium and/or an inert solvent, e.g., methanol, ethanol, dioxane, tetrahydrofuran, and the like, at temperatures from between about −30° C. and about 200° C.

The compounds of Formulae IV and V (wherein, in each, R' is hydrogen) and the Formula VI can be readily converted to carboxylic acid salts by suspending them in water and adding one molar equivalent of a base such as sodium, potassium or ammonium hydroxide, lyophilyzing the resulting solution to give a powdery residue of the respective sodium, potassium or ammonium salt.

All of the compounds embraced by Formulae II through VI of the flowsheet, above, and those of Formulae VII and VIII (produced as by-products in Example 3, below) can be isolated from their respective reaction mixtures by conventional means, for example, when a water-miscible solvent is used, by pouring the reaction mixture into water and separating the resultant precipitate by filtration. Additional purification of the product can be accomplished by conventional methods, for example, by single solvent elution chromatography from an adsorbent column with a suitable solvent, such as, acetone, methanol, dilute methanol, ethanol, ethylene chloride; also by gradient elution chromatography from an adsorbent column with a suitable mixture of solvents, such as, methylene chloride-Skellysolve B (hexanes), acetone-Skellysolve B, and the like.

The compounds embraced by Formulae IV, V, VI, VII and VIII possess anti-inflammatory, central nervous system depressant and hypoglycemic activities; also, they are particularly useful in protection against allergy and anaphylaxis induced by release of Slow Reacting Substance (SRS–A), and in the treatment of asthma. The foregoing properties make the new compounds useful in medical and veterinary practice.

The compounds of the invention can be prepared and administered to mammals, birds, humans, and animals, in a wide variety of oral or parenteral dosage forms, singly or in admixture with other coacting compounds. They can be administered with a pharmaceutical carrier which can be a solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups, or elixirs.

It is to be understood that the invention is not to be limited to the exact details of operation or exact compositions shown and described herein as obvious modifications and equivalents will be apparent to one skilled in the art, and the invention is therefore to be limited only by the scope of the appended claims.

EXAMPLE 1

*21-methoxyoxalyl-3β-hydroxy-5-pregnen-20-one (II)*

A stirred mixture of 240 ml. of dry benzene, 6 ml. of absolute methanol and 30 ml. of 25% sodium methoxide in methanol was distilled under dry nitrogen until 90 ml. of distillate was collected. The residue in the flask was cooled and 27 g. of redistilled dimethyl oxalate added, followed by a solution of 42 g. of 3β-hydroxy-5-pregnen-20-one 3-acetate (pregnenolone acetate) (I) in 600 ml. of dry benzene. After stirring for about 30 minutes, 120 ml. of ether was added, followed at one-half hour intervals with two 600 ml. portions of ether. After stirring for an additional hour, the precipitate was filtered, washed quickly with ether and dried in a vacuum dessicator. This solid was then stirred in 1200 ml. of ice-water and acidified with about 8 ml. of concentrated hydrochloric acid. After stirring for about 15 minutes, the solid was filtered, washed with water and dried to give 38 g. of 21-methoxyoxalyl-3β-hydroxy-5-pregnen-20-one (II). This material was used without purification in the next step described in Example 2.

Following the procedure of Example 1, but substituting for the starting steroid 3β-hydroxy-5-pregnen-20-one 3-acetate (I), the following representative starting materials:

(1) 3β-hydroxy-5-pregnen-20-one (I),
(2) 3β-hydroxy-5-pregnen-20-one 3-propionate (I),
(3) 3β,11α-dihydroxy-5-pregnen-20-one 3-acetate (I),
(4) 3β,11β-dihydroxy-5-pregnen-20-one (I),
(5) 3β-hydroxy-5-pregnen-11,20-dione (I),
(6) 3β-hydroxy-6-methyl-5-pregnen-20-one (I)
(7) 3β,11β-dihydroxy-6-methyl-5-pregnen-20-one 3-acetate (1),
(8) 3β-11α-dihydroxy-6-methyl-5-pregnen-20-one (I),
(9) 3β-hydroxy-6-methyl-5-pregnene-11,20-dione (I),
(10) 3β-hydroxy-5α-pregnan-20-one (I),
(11) 3α-hydroxy-5α-pregnan-20-one 3-acetate (I),
(12) 3β,11β-dihydroxy-5α-pregnan-20-one (I),
(13) 3α,11α-dihydroxy-5α-pregnan-20-one (I),
(14) 3β,11α-dihydroxy-5α-pregnan-20-one 3-acetate (I),
(15) 3β-hydroxy-5α-pregnan-11,20-dione (I),
(16) 3β-hydroxy-5β-pregnan-20-one 3-acetate (I),
(17) 3α-hydroxy-5β-pregnan-20-one (I),
(18) 3α,11α-dihydroxy-5β-pregnan-20-one 3-acetate (I),
(19) 3β,11β-dihydroxy-5β-pregnan-20-one (I) and
(20) 3β-hydroxy-5β-pregnan-11,20-dione (I), yields, respectively:

(1) 21-methoxyoxalyl-3β-hydroxy-5-pregnen - 20 - one (II),
(2) 21-methoxyoxalyl-3β-hydroxy-5-pregnen - 20 - one (II),
(3) 21-methoxyoxalyl-3β,11α-dihydroxy-5-pregnen-20 - one (II),
(4) 21-methoxyoxalyl-3β,11β-dihydroxy-5-pregnen-20 - one (II),
(5) 21-methoxyoxalyl-3β-hydroxy-5 - pregnen - 11,20 - dione (II),
(6) 21-methoxyoxalyl-3β-hydroxy-6-methyl-5-pregnen-20-one (II),
(7) 21-methoxyoxalyl-3β,11β-dihydroxy-6 - methyl - 5-pregnen-20-one (II),
(8) 21-methoxyoxyalyl-3β,11α-dihydroxy-6-methyl - 5 - pregnen-20-one (II), (9) 21-methoxyoxalyl-3β-hydroxy-6-methyl - 5 - pregnene-11,20-dione (II),
(10) 21-methoxyoxalyl-3β-hydroxy-5α-pregnan-20-one (II),
(11) 21-methoxyoxalyl-3α-hydroxy-5α-pregnan-20-one (II),
(12) 21-methoxyoxalyl-3β,11β-dihydroxy-5α - pregnan-20-one (II),
(13) 21-methoxyoxalyl-3α,11α-dihydroxy-5α - pregnan-20-one (II),
(14) 21-methoxyoxalyl-3β,11α-dihydroxy-5α-pregnan-20-one (II),
(15) 21-methoxyoxalyl-3β-hydroxy-5α-pregnan - 11,20-dione (II),
(16) 21-methoxyoxalyl-3β-hydroxy-5β-pregnan-20-one (II),
(17) 21-methoxyoxalyl-3α-hydroxy-5β-pregnan-20-one (II),
(18) 21-methoxyoxalyl-3α,11α-dihydroxy-5β - pregnan-20-one (II),
(19) 21-methoxyoxalyl-3β,11β-dihydroxy-5β - pregnan-20-one (II) and
(20) 21-methoxyoxalyl-3β-hydroxy-5β-pregnan - 11,20-dione (II).

Following the procedure of Example 1 and the immediately preceding paragraph but substituting for methanol, sodium methoxide and dimethyl oxalate, the ethyl, propyl, butyl, etc., counterparts thereof, yields the corresponding 21-alkoxyoxalyl compounds, e.g., the 21-ethoxyoxalyl, 21-propoxyoxalyl, 21-butoxyoxalyl, etc., compounds corresponding to the above produced 21-methoxyoxalyl steroids.

EXAMPLE 2

Enol acetate of 21-methoxyoxalyl-3β-acetoxy-5-pregnen-20-one (III)

Three grams of the crude 21-methoxyoxalyl-3β-hydroxy-5-pregnen-20-one (II) (from Example 1) was heated for about five minutes on a steam bath with 5 ml. of acetic anhydride and 5 ml. of pyridine. The reaction mixture was allowed to stand for about one hour at room temperature after which water was added. The product was extracted with ethyl acetate, and the extract washed successively with water, 1N hydrochloric acid, saturated sodium bicarbonate solution, dried, and evaporated to leave a non-crystalline residue. This was chromatographed on 200 g. of Florisil (synthetic magnesium silicates) and eluted with 1 liter each of 5%, 10%, 25% and 50% acetone in Skellysolve B mixtures, collecting 150 ml. fractions. Fractions 8 to 13 contained 1.80 g. of non-crystalline gummy oil showing infrared absorptions at 1770 (enol acetate), 1730 (3-acetate and methyl ester), 1680 (20-ketone) and 1605 cm.$^{-1}$ (C=C), characteristic of the enol acetate structure.

Following the procedure of Example 2, but substituting for the starting steroid 21-methoxyoxalyl-3β-hydroxy-5-pregnen-20-one (II), the following representative starting materials:

(1) 21-methoxyoxalyl-3β-hydroxy-5-pregnen - 20 - one (II),
(2) 21-methoxyoxalyl-3β,11α-dihydroxy-5-pregnen-20 - one (II),
(3) 21-methoxyoxalyl-3β,11β-dihydroxy-5-pregnen-20-one (II),
(4) 21-methoxyoxalyl-3β-hydroxy-5-pregnen - 11,20 - dione (II),
(5) 21-methoxyoxalyl-3β-hydroxy-6-methyl-5-pregnen - 20-one (II),
(6) 21-methoxyoxalyl-3β,11β-dihydroxy-6-methyl - 5 - pregnen-20-one (II),
(7) 21-methoxyoxalyl-3β,11α-dihydroxy-6-methyl - 5 - pregnen-20-one (II),
(8) 21-methoxyoxalyl-3β-hydroxy-6-methyl - 5 - pregnene-11,20-dione (II),
(9) 21-methoxyoxalyl-3β-hydroxy-5α-pregnan-20 - one (II),
(10) 21-methoxyoxalyl-3α-hydroxy-5α-pregnan-20 - one (II),
(11) 21-methoxyoxalyl-3β,11β-dihydroxy-5α - pregnan-20-one (II),
(12) 21-methoxyoxalyl-3α,11α-dihydroxy-5α - pregnan-20-one (II),
(13) 21-methoxyoxalyl-3β,11α-dihydroxy - 5α-pregnan-20-one (II),
(14) 21-methoxyoxalyl-3β-hydroxy-5α-pregnan - 11,20-dione (II),
(15) 21-methoxyoxalyl-3β-hydroxy-5β-pregnan - 20 - one (II),
(16) 21-methoxyoxalyl-3α-hydroxy-5β-pregnan - 20 - one (II),
(17) 21-methoxyoxalyl-3α,11α-dihydroxy-5β - pregnan-20-one (II),
(18) 21-methoxyoxalyl-3β,11β-dihydroxy-5β - pregnan-20-one (II) and
(19) 21-methoxyoxalyl-3β-hydroxy-5β-pregnan - 11,20-dione (II), yields, respectively, the enol acetates of:

(1) 21-methoxyoxalyl-3β-acetoxy-5-pregnen - 20 - one (III),
(2) 21-methoxyoxalyl-3β,11α-diacetoxy-5-pregnen - 20-one (III),
(3) 21-methoxyoxalyl-3β-acetoxy-11β-hydroxy-5 - pregnen-20-one (III),
(4) 21-methoxyoxalyl-3β-acetoxy-5-pregnen - 11,20 - dione (III),
(5) 21-methoxyoxalyl-3β-acetoxy-6-methyl - 5 - pregnen-20-one (III),
(6) 21 - methoxyoxalyl - 3β - acetoxy-11β-hydroxy-6-methyl-5-pregnen-20-one (III),
(7) 21 - methoxyoxylal - 3β,11α - diacetoxy-6-methyl-5-pregnen-20-one (III),
(8) 21 - methoxyoxalyl - 3β - acetoxy-6-methyl-5-pregnene-11,20-dione (III),
(9) 21 - methoxyoxalyl-3β-acetoxy-5α-pregnan-20-one (III),
(10) 21 - methoxyoxalyl - 3α - acetoxy-5α-pregnan-20-one (III),
(11) 21 - methoxyoxalyl - 3β-acetoxy-11β-hydroxy-5α-pregnan-20-one (III),
(12) 21 - methoxyoxalyl - 3α,11α - diacetoxy-5α-pregnan-20-one (III),
(13) 21 - methoxyoxalyl - 3β,11α - diacetoxy-5α-pregnan-20-one (III),
(14) 21 - methoxyoxalyl - 3β - acetoxy - 5α-pregnan-11,20-dione (III),
(15) 21 - methoxyoxalyl - 3β - acetoxy - 5β - pregnan-20-one (III),
(16) 21 - methoxyoxalyl - 3α - acetoxy - 5β - pregnan-20-one (III),
(17) 21 - methoxyoxalyl - 3α,11α - diacetoxy - 5β-pregnan-20-one (III),
(18) 21 - methoxyoxalyl - 3β - acetoxy - 11β-hydroxy-5β - pregnan-20-one (III) and
(19) 21 - methoxyoxalyl - 3β - acetoxy - 5β - pregnan-11,20-dione (III).

Following the procedure of Example 2 and the immediately preceding paragraph but substituting as starting materials other corresponding 21-alkoxyoxalyl compounds, e.g., the 21-ethoxyoxalyl, 21-propoxyoxalyl, 21-butoxyoxalyl, etc. counterparts, yields the respective 21-alkoxyoxalyl compounds corresponding to the above produced 21-methoxyoxalyl steroids.

Following the procedure of Example 2 and the two immediately preceding paragraphs but substituting for acetic anhydride another appropriate hydrocarbon carboxylic acid anhydride, yields other enol acylates of the compounds of Formula III, such as the propionate, butyrate, valerate, hexanoate, trimethylacetate, isobutyrate, isovalerate, decanoate, cyclopentylpropionate, crotonate, undecylanate, cinnamate and citraconate.

EXAMPLE 3

*17β-(4-carboxypyrazol-5-ylcarbonyl)-androst-5-en-3β-ol, acetate, methyl ester (IV)*

Ten grams of the combined chromatograph portions of the enol acetate of 21-methoxyoxalyl-3β-acetoxy-5-pregnen-20-one (III) (from Example 2) was treated with ethereal diazomethane (prepared by slowly adding 16.5 g. of N-methyl-N-nitroso-N'-nitroguanidine to an ice-cold mixture of 37.5 g. of potassium hydroxide, 38 ml. of water and 150 ml. of ether). After stirring for about 3 hours the resulting suspension was evaporated under vacuum and the crude solid product chromatographed on 600 g. of Florisil. Elution with 2 liters each of 5%, 10%, 25% and 50% acetone in Skellysolve B mixtures, collecting 300 ml. portions gave 4.339 g. of crystalline fractions (Numbers 19 through 35) of the desired pyrazole product (IV). Recrystallization with acetone gave 3.06 g. of 17β-(4-carboxypyrazol - 5 - ylcarbonyl)-androst-5-en-3β-ol, acetate, methyl ester (IV), melting at 281 to 284° C. This material showed strong end absorption with a shoulder at 240 mμ and a low intensity peak at 320 mμ in the ultraviolet. In the infrared absorptions occurred at 3250 (N–H), 1730 (acetate and methyl ester), 1680 (20-ketone) and 1540 cm.$^{-1}$ (C=C or C=N).

*Analysis.*—Calcd. for $C_{17}H_{38}O_5N_2$: C, 68.91; H, 8.14; N, 5.95. Found: C, 69.09; H, 7.89; N, 5.96.

Two by-products were formed in this reaction.

Fractions 12 to 18 of the chromatogram contained 4.2 g. of crystalline material which was recrystallized several times from acetone and Skellysolve B to give colorless 17β - (4 - carboxy-4-acetoxy-4,5-dihydropyrazol-5-ylcarbonyl)-androst-5-en-3β-ol, acetate, methyl ester (VII), melting at 160 to 161° C. This compound showed strong ester absorption (1765 and 1735 cm.$^{-1}$) in the infrared as well as ketone at 1700 cm.$^1$. Nuclear magnetic resonance data confirmed the structure predicted for the compound (VII), i.e.,

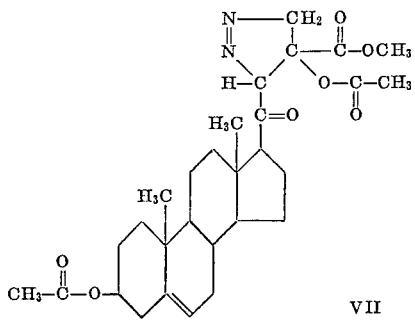

VII

*Analysis.*—Calcd. for $C_{19}H_{40}O_7N_2$: C, 65.89; H, 7.63; N, 5.30. Found: C, 65.96; H, 7.73; N, 5.58.

When this compound (VII) was heated with triethylamine it was converted to 17β-(4-carboxypyrazol-5-ylcarbonyl)-androst-5-en-3β-ol, acetate, methyl ester (IV).

Fractions 6 through 11 contained 357 mg. of crystalline material which was recrystallized from acetone-Skellysolve B to give 17β-(4-carboxy-1-methylpyrazol-5-ylcarbonyl)-androst-5-en-3β-ol, acetate, methyl ester (VIII), melting at 146 to 147° C. This compound showed strong ester absorption (1735 cm.$^{-1}$), ketone (1700 cm.$^{-1}$) and strong C=N or C=C (1540 cm.$^{-1}$) in the infrared, with absorptions at 253 mμ (8000) and 318 mμ (207) in the ultraviolet. Nuclear magnetic resonance absorptions and analyses were consistent with the structural formula predicted for the compound (VIII), i.e.,

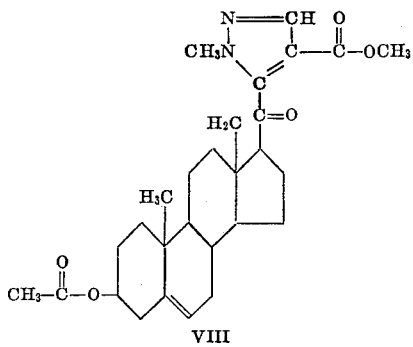

VIII

*Analysis.*—Calcd. for $C_{28}H_{38}O_5N_2$: C, 69.98; H, 7.94; N, 5.81. Found: C, 69.56; H, 8.09; N, 5.91.

Following the procedure of Example 3, but substituting for the enol acetate of 21-methoxyoxalyl-3β-acetoxy-5-pregnen-20-one (III) the following representative starting enol acetates of:

(1) 21 - methoxyoxalyl - 3β - acetoxy - 11β - hydroxy-5-pregnen-20-one (III), (2) 21 - methoxyoxalyl - 3β - acetoxy - 5 - pregnene-11,20-dione (III), (3) 21 - methoxyoxalyl - 3β - acetoxy - 6 - methyl - 5-pregnen-20-one (III), (4) 21 - methoxyalyl - 3β - acetoxy - 11β - hydroxy - 6-methyl-5-pregnen-20-one (III), (5) 21 - methoxyoxyalyl - 3β - acetoxy - 6 - methyl - 5-pregnene-11,20-dione (III), (6) 21 - methoxyoxalyl - 3β - acetoxy - 5α-pregnan-20-one (II), (7) 21 - methoxyoxalyl - 3α - acetoxy - 5α-pregnan-20-one (III), (8) 21 - methoxyoxalyl - 3α - acetoxy - 5β-pregnan-20-one (III), (9) 21 - methoxyoxalyl - 3β - acetoxy - 11β - hydroxy-5β-pregnan-20-one (III) and

(10) 21 - methoxyoxalyl - 3β - acetoxy - 5β - pregnan-11,20-dione (III) yields, respectively:

(1) 17β - (4 - carboxypyrazol - 5 - ylcarbonyl)-androst-5-en-3β,11β-diol, 3β-acetate, methyl ester (IV); 17β-(4-carboxy - 4 - acetoxy - 4,5 - dihydropyrazol - 5 - ylcarbonyl) - androst - 5 - en-3β,11β-diol, 3-acetate, methyl ester (VII); 17β - (4 - carboxy-1-methylpyrazol-5-ylcarbonyl)-androst-5-en-3β,11β-diol, 3-acetate, methyl ester (VIII);

(2) 17β - (4 - carboxypyrazol - 5 - ylcarbonyl)-androst-5-en-3β-ol-11-one, 3-acetate, methyl ester (IV); 17β - (4 - carboxy - 4 - acetoxy - 4,5 - dihydropyrazol-5-ylcarbonyl) - androst-5-en-3β-ol-11-one, 3-acetate, methyl ester (VII); 17β - (4 - carboxy - 1 - methylpyrazol - 5-ylcarbonyl) - androst-5-en-3β-ol-11-one, 3-acetate, methyl ester (VIII);

(3) 17β - (4 - carboxypyrazol - 5 - ylcarbonyl) - androst-5-en-6-methyl-3β-ol, acetate, methyl ester (IV); 17β - (4 - carboxy - 4 - acetoxy - 4,5 - dihydropyrazol-5-ylcarbonyl)-androst-5-en-6-methyl-3β-ol, acetate, methyl ester (VII); 17β-(4-carboxy-1-methylpyrazole-5-ylcarbonyl) - androst - 5-en-6-methyl-3β-ol, acetate, methyl ester (VIII);

(4) 17β - (4 - carboxypyrazol - 5 - ylcarbonyl) - androst-5-en-6-methyl-3β,11β-diol, 3-acetate, methyl ester (IV); 17β - (4 - carboxy - 4 - acetoxy - 4,5 - dihydropyrazol - 5-ylcarbonyl)-androst-5-en-6-methyl-3β,11β-diol, 3-acetate, methyl ester (VII); 17β-(4-carboxy-1-methylpyrazol-5-ylcarbonyl)-androst-5-en-6-methyl-3β,11β-diol, 3-acetate, methyl ester ( VIII);

(5) 17β - (4 - carboxypyrazol - 5 - ylcarbonyl) - androst-5-en-6-methyl-3β-ol-11-one, 3-acetate, methyl ester (IV); 17β - (4 - carboxy - 4-acetoxy-4,5-dihydropyrazol-5 - ylcarbonyl) - androst - 5 - en - 6 - methyl - 3β - ol-11-one, 3-acetate, methyl ester (VII); 17β-(4-carboxy-1- methylpyrazol - 5 - ylcarbonyl) - androst - 5 - en - 6-methyl-3β-ol-11-one, 3-acetate, methyl ester (VIII);

(6) 17β - (4 - carboxypyrazol - 5 - ylcarbonyl) - 5α-androstan-3β-ol, acetate, methyl ester (IV); 17β-(4-carboxy - 4 - acetoxy - 4,5-dihydropyrazol-5-ylcarbonyl)-5α-androstan-3β-ol, acetate, methyl ester (VII); 17β-(4-carboxy - 1 - methylpyrazol - 5 - ylcarbonyl)-5α-androstan-3β-ol, acetate, methyl ester (VIII);

(7) 17β - (4 - carboxypyrazol - 5 - ylcarbonyl) - 5α-androstan-3α-ol, acetate, methyl ester (IV); 17β-(4-carboxy - 4 - acetoxy - 4,5 - dihydropyrazol - 5 - ylcarbonyl)-5α-androstan-3α-ol, acetate, methyl ester; 17β-(4-carboxy-1 - methylpyrazol - 5 - ylcarbonyl) - 5α - androstan-3α-ol, acetate, methyl ester (VIII);

(8) 17β - (4 - carboxypyrazol - 5 - ylcarbonyl - 5β-androstan-3α-ol, acetate, methyl ester (IV); 17β-(4-carboxy - 4 - acetoxy - 4,5 - dihydropyrazol - 5 - ylcarbonyl)-5β-androstan-3α-ol, acetate, methyl ester (VII); 17β-(4-carboxy - 1 - methylpyrazol - 5 - ylcarbonyl-5β-androstan-3α-ol, acetate, methyl ester (VIII);

(9) 17β - (4 - carboxypyrazol - 5 - ylcarbonyl) - 5β-androstane-3β,11β-diol, 3-acetate, methyl ester (IV); 17β-(4 - carboxy - 4 - acetoxy - 4,5 - dihydropyrazol - 5 - ylcarbonyl) - 5β - androstane-3β,11β-diol, 3-acetate, methyl ester (VII); 7β - (4-carboxy-1-methylpyrazol-5-ylcarbonyl) - 5β - androstane-3β,11β-diol, 3-acetate, methyl ester (VIII);

(10) 17β - (4 - carboxypyrazol - 5 - ylcarbonyl) - 5β - androstan-3β-ol-11-one, 3-acetate, methyl ester; 17β-(4-carboxy - 4 - acetoxy - 4,5 - dihydropyrazol - 5 - ylcarbonyl)-5β-androstan-3β-ol-11-one, 3-acetate, methyl ester (VII); 7β - (4 - carboxy - 1 - methylpyrazol - 5 - ylcarbonyl)-5β-androstan-3β-ol-11-one, 3-acetate, methyl ester (VIII).

As indicated heretofore, the compounds of this invention are useful in therapy for their anti-inflammatory, central nervous system depressant, hypoglycemic, anti-allergic, anti-anaphylactic and anti-asthmatic activities, and particularly in the treatment of rheumatic, psychoneurotic, diabetic and asthmatic ailments. Administration to mammals, including humans, depends on the particular compound involved, severity of the condition being treated and the individual's response to the medication. In general, a dose of about 5 to 1000 mg. of each of the compounds exemplified in Example 3 and/or embraced within Formulas IV through VIII of the flow-sheet is given one to three times a day, and preferably about 50 to about 500 mg. thereof one to three times a day, in the treatment of conditions incident to the foregoing activities when incorporated in conventional pharmaceutical compositions.

The following examples illustrate the incorporation of the active ingredients of this invention in pharmaceutical formulation.

EXAMPLE 4

*Compressed tablets*

A lot of 10,000 compressed tablets, each containing 10 mg. of 17β-(4-carboxypyrazol-5-ylcarbonyl)-androst-5-en-3β-ol, acetate, methyl ester (IV) is prepared from the following ingredients:

|   | Gm. |
|---|---|
| 17β - (4 - carboxypyrazol - 5 - ylcarbonyl) - androst-5-en-3β-ol, acetate, methyl ester (IV) | 100 |
| Dicalcium phosphate | 2500 |
| Methylcellulose, USP (15 cps.) | 65 |
| Talc, bolted | 450 |
| Calcium stearate, fine powder | 35 |

The 17β - (4 - carboxypyrazol - 5 - ylcarbonyl) - androst-5-en-3β-ol, acetate, methyl ester (IV) and dicalcium phosphate are mixed well, granulated with 7.5 percent solution of methylcellulose in water, passed through a No. 8 screen and dried at 120° F. The dried granules are passed through a No. 12 screen, mixed thoroughly with the talc and stearate and compressed into tablets.

One tablet is given 3 times daily in the oral treatment of asthma, anaphylaxis and allergy in adult humans.

EXAMPLE 5

*Hard gelatin capsules*

A lot of 1000 hard gelatin capsules, each containing 100 mg. of 17β-(4-carboxypyrazol-5-ylcarbonyl)-androst-5-en-3β-ol, acetate, methyl ester (IV) is prepared from the following ingredients:

|   | Gm. |
|---|---|
| 17β - (4 - carboxypyrazol - 5 - ylcarbonyl) - androst-5-en-3β-ol, acetate, methyl ester (IV), micronized | 100 |
| Starch, dried | 150 |
| Calcium stearate | 2 |
| Talc | 3 |

The starch, talc and stearate are mixed well and the 17β - (4 - carboxypyrazol - 5 - ylcarbonyl) - androst - 5-en, 3β-ol, acetate, methyl ester (IV) is incorporated into the mixture. The whole is mixed well and filled into two-piece hard gelatin capsules.

The capsules are used in the reduction of asthmatic seizures, anaphylactic shock and allergic manifestations in adult humans at a dose of 3–6 capsules daily.

EXAMPLE 6

*Soft gelatin capsules*

A batch of 1000 soft gelatin capsules, each containing 50 mg. of 17β-(4-carboxypyrazol-5-ylcarbonyl)-androst-5-en-3β-ol, acetate, methyl ester (IV) and corn oil is prepared from the following materials:

|   | Gm. |
|---|---|
| 17β - (4 - carboxypyrazol - 5 - ylcarbonyl) - androst-5-en-3β-ol, acetate, methyl ester (IV), micronized | 50 |
| Corn oil, q.s. | |

A uniform dispersion of the active ingredient in the corn oil is prepared and the dispersion filled into soft gelatin capsules by conventional means.

One capsule is given three times a day in the treatment of asthma, anaphylaxis and allergy in adult humans.

EXAMPLE 7

*Aqueous oral suspension*

An aqueous oral suspension containing in each 5 ml. 500 mg. of 17β-(4-carboxypyrazol-5-ylcarbonyl)-androst-5-en-3β-ol, acetate, methyl ester (IV) is prepared from the following materials:

| | | |
|---|---|---|
| 17β - (4 - carboxypyrazol - 5 - ylcarbonyl) - androst-5-en-3β-ol, acetate, methyl ester (IV), micronized | gm | 1000 |
| Methylparaben, USP | gm | 7.5 |
| Propylparaben, USP | gm | 2.5 |
| Saccharin sodium | gm | 12.5 |
| Cyclamate sodium | gm | 2.5 |
| Glycerin | ml | 3000 |
| Tragacanth powder | gm | 100 |
| Orange oil flavor | gm | 10 |
| F.D. and C. orange dye | gm | 7.5 |
| Deionized water (q.s. to) | ml | 10,000 |

One teaspoonful (5 ml.) three times daily is employed in the treatment of asthma, anaphylaxis and allergy in adult humans.

EXAMPLE 8

*Aqueous suspension for injection*

A suspending vehicle is prepared from the following materials:

| | | |
|---|---|---|
| Polyethylene glycol 4000 | gm | 30 |
| Potassium chloride | gm | 11.2 |
| Polysorbate 80 | gm | 2 |
| Methylparaben | gm | 1.8 |
| Propylparaben | gm | 0.2 |
| Water for injection (q.s.) | ml | 1000 |

The parabens are added to a major portion of the water and are dissolved therein by stirring and heating to 65° C. The resulting solution is cooled to room temperature and the remainder of the ingredients are added and dissolved. The balance of the water to make up the required volume is then added and the solution sterilized by filtration. The sterile vehicle thus prepared is then mixed with 50 gm. of 17β - (4 - carboxypyrazol - 5 - ylcarbonyl) - androst - 5-en-3β-ol, acetate, methyl ester (IV) which has been previously reduced to a particle size less than about 10 microns and sterilized with ethylene oxide gas. The mixture is passed through a sterilized colloid mill and filled under aseptic conditions into sterile containers which are then sealed.

Each milliliter of this suspension contains 50 mg. of 17β - (4 - carboxypyrazol - 5 - ylcarbonyl) - androst - 5-en-3β-ol, acetate, methyl ester (IV). The suspension is used intramuscularly in 1-ml. doses in the treatment of asthmatic, anaphylactic and allergic ailments.

The procedures described above in Examples 4 through 8 for the preparation of compositions of 17β-(4-carboxypyrazol-5-ylcarbonyl)-androst-5-en-3β-ol, acetate, methyl ester (IV) can also be employed in the production of medicaments wherein the active ingredient is another compound embraced by Formula IV or one included within Formulae V through VIII, e.g., 17β-(4-carboxypyrazol-5-ylcarbonyl)-androst-5-en-3β-11β-diol, 3-acetate, methyl ester (IV), 17β-(4-carboxypyrazol-5-ylcarbonyl)-androst-5-en-6-methyl-3β-ol, acetate, methyl ester (IV), 17β-(4 - carboxypyrazol - 5 - ylcarbonyl)-androst-5-en-6-methyl-3β,11β-diol, 3-acetate, methyl ester (IV), 17β-(4-carboxypyrazol - 5 - ylcarbonyl) - 5α - androstan - 3β - ol, acetate, methyl ester (IV), 17β - (4 - carboxypyrazol - 5-ylcarbonyl)-5β-androstane-3β,11β-diol, 3 - acetate, methyl ester (IV), 17β - (4-carboxyprazol-5-ylcarbonyl)-androst-5-en-3β-ol, methyl ester (V), 17β-(4-carboxypyrazol-5-ylcarbonyl)-androst-5-en-3β,11β-diol, methyl ester (V), 17β-(4 - carboxypyrazol - 5 - ylcarbonyl)-androst-5-en-6-methyl-3β,11β-diol, methyl ester (V), 17β-(4-carboxypyrazol-5-ylcarbonyl) - 5α - androstan-3β-ol, methyl ester (V), 17β-(4 - carboxypyrazol - 5 - ylcarbonyl)-5β-androstane-3β,11β-diol, methyl ester (V), 17β - (4 - carboxypyrazol-5-ylcarbonyl)-androst - 5- en - 3β - ol (VI), the sodium salt of 17β-(4-carboxypyrazol-5-ylcarbonyl)-androst-5-en-3β-ol (VI), 17β-(4-carboxypyrazol-5-ylcarbonyl)-androst-5-en-6-methyl - 3β - ol (VI), 17β-(4-carboxypyrazol - 5 - ylcarbonyl) - 6 - methyl - 3β,11β - diol (VI), 17β - (4-carboxypyrazol-5-ylcarbonyl)-5α-androstan-3β-ol (VI), 17β-(4-carboxypyrazol - 5 - ylcarbonyl)-5β-androstane-3β,11β-diol (VI), 17β-(4-carboxy-acetoxy-4,5-dihydropyrazol - 5 - ylcarbonyl) - androst-5-en-3β-ol, acetate, methyl ester (VII), 17β-(4-carboxy-4-acetoxy-4,5-dihydropyrazol-5-ylcarbonyl) - androst - 5 - en - 3β,11β - diol, diacetate, methyl ester (VII), 17β-(4-carboxy-4-acetoxy-4,5 - dihydropyrazol-5-ylcarbonyl)-androst-5-en-6-methyl-3β-ol, acetate, methyl ester (VII), 17β-(4-carboxy-4-acetoxy - 4,5 - dihydropyrazol-5-ylcarbonyl)-androst-5-en-6-methyl-3β,11β-diol, 3-acetate, methyl ester (VII), 17β-(4-carboxy - 4 - acetoxy - 4,5 - dihydropyrazol-5-ylcarbonyl)-5α-androstan-3β-ol, acetate, methyl ester (VII), 17β-(4-carboxy - 4 - acetoxy - 4,5 - dihydropyrazol-5-ylcarbonyl)-5β-androstane-3β,11β-diol, 3-acetate, methyl ester (VII), 17β - (4 - carboxy-1-methylpyrazol-5-ylcarbonyl)-androst-5-en-3β-ol, acetate, methyl ester (VIII), 17β-(4-carboxy-1-methylpyrazol) - androst-5-en-3β,11β-diol, 3-acetate, methyl ester (VIII), 17β-(4-carboxy-1-methyl-pyrazol-5-ylcarbonyl) - androst - 5 - en - 6 - methyl-3β-ol, acetate, methyl ester (VIII), 17β-(4-carboxy-1-methyl-pyrazol-5-ylcarbonyl) - androst-5-en-5-methyl-3β,11β-diol, 3-acetate, methyl ester (VIII), 17β-(4-carboxy-1-methyl-pyrazol-5-ylcarbonyl)-5α-androstan-3β-ol, acetate, methyl ester (VIII) and 17β-(4-carboxy-1-methylpyrazol-5-ylcarbonyl)-5β-androstane-3β,11β-diol, diacetate, methyl ester (VIII).

While the treatment of asthmatic, anaphylactic and allergic ailments disclosed following Examples 4 through 8 utilizes 17β-(4-carboxypyrazol-5-ylcarbonyl)-androst-5-en-3β-ol, acetate, methyl ester (IV), similarly effective therapy is provided with comparable dosages by employing medicaments wherein the active ingredient is another compound embraced by Formula IV or one included within Formulae V through VIII, e.g., 17β-(4-carboxypyrazol-5-ylcarbonyl)-androst-5-en-3β,11β-diol, 3-acetate, methyl ester (IV), 17β-(4-carboxypyrazol-5-ylcarbonyl)-androst-5-en-6-methyl-3β-ol, acetate, methyl ester (IV), 17β-(4 - carboxypyrazol - 5 - ylcarbonyl)-androst-5-en-6-methyl-3β,11β-diol, 3-acetate, methyl ester (IV), 17β-(4-carboxypyrazol-5-ylcarbonyl)-5α-androstan-3β-ol, acetate, methyl ester (IV), 17β-(4-carboxypyrazol-5-ylcarbonyl)-5β-androstane-3β,11β-diol, 3-acetate, methyl ester (IV), 17β - (4-carboxypyrazol-5-ylcarbonyl)-androst-5-en-3β-ol, methyl ester (V), 17β-(4-carboxypyrazol-5-ylcarbonyl)-androst-5-en-3β,11β-diol, methyl ester (V), 17β-(4-carboxypyrazol - 5 - ylcarbonyl) - androst-5-en-6-methyl-3β, 11β - diol, methyl ester (V), 17β - (4 - carboxypyrazol-5-ylcarbonyl)-5α-androstan-3β-ol, methyl ester (V), 17β-(4 - carboxypyrazol-5-ylcarbonyl)-5β-androstane-3β,11β-diol, methyl ester (V), 17β-(4-carboxypyrazol-5-ylcarbonyl)-androst - 5 - en - 3β - ol, (VI), the sodium salt of 17β - (4 - carboxypyrazol - 5 - ylcarbonyl)-androst-5-en-3β-ol (VI), 17β-(4-carboxypyrazol-5-ylcarbonyl)-androst-5-en-6-methyl-3β-ol (VI), 17β-(4-carboxypyrazol-5-ylcarbonyl)-6-methyl - 3β,11β - diol (VI), 17β-(4-carboxypyrazol-5-ylcarbonyl)-5α-androstan-3β-ol (VI), 17β - (4-carboxypyrazol-5-ylcarbonyl) - 5β - androstane-3β,11β-diol (VI), 17β-(4-carboxy-4-acetoxy - 4,5 - dihydropyrazol-5-ylcarbonyl)-androst - 5 - en - 3β - ol, acetate, methyl ester (VII), 17β - (4-carboxy-4-acetoxy-4,5-dihydropyrazol-5-ylcarbonyl) - androst-5-en-3β,11β-diol, 3-acetate, methyl ester (VII), 17β-(4-carboxy - 4 - acetoxy-4,5-dihydropyrazol - 5 - ylcarbonyl)-androst-5-en-6-methyl-3β-ol, acetate, methyl ester (VII), 17β-(4-carboxy-4-acetoxy-4,5-dihydropyrazol-5-ylcarbonyl)-androst - 5 - en - 6 - methyl-3β, 11β-diol, 3-acetate, methyl ester (VII), 17β-(4-carboxy-4-acetoxy - 4,5 - dihydropyrazol-5-ylcarbonyl)-5α-androstan-3β-ol, acetate, methyl ester (VII), 17β-(4-carboxy-4 - acetoxy - 4,5 - dihydropyrazol-5-ylcarbonyl)-5β-androstane-3β,11β-diol, 3-acetate, methyl ester (VII), 17β-(4-carboxy - 1 - methylpyrazol - 5 - ylcarbonyl)-androst-5-en-3β-ol, acetate, methyl ester (VIII), 17β-(4-carboxy-1-methylpyrazol - 5 - ylcarbonyl)-androst-5-en-3β,11β-diol, 3-acetate, methyl ester (VIII), 17β-(4-carboxy-1-methyl-pyrazol-5-ylcarbonyl)-androst - 5 - en - 6 - methyl-3β-ol, acetate, methyl ester (VIII), 17β-(4-carboxy-1-methyl-pyrazol - 5 - ylcarbonyl) - androst-5-en-6-methyl-3β,11β-diol, 3-acetate, methyl ester (VIII), 17β-(4-carboxy-1-methylpyrazol-5-ylcarbonyl)-5α-androstan-3β-ol, acetate, methyl ester (VIII), and 17β-(4-carboxy-1-methyl-pyrazol-5-ylcarbonyl) - 5β - androstan-3β,11β-diol, 3-acetate, methyl ester (VIII).

I claim:
1. Compounds of the formula

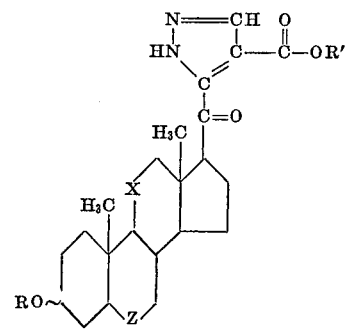

wherein ~ is a generic expression denoting α- and β-bonds and mixtures thereof; R is selected from the group consisting of hydrogen and the acyl radical of a hydrocarbon carboxylic acid containing from one to twelve carbon atoms, inclusive; R' is selected from the group consisting of hydrogen, lower alkyl and pharmacologically acceptable salt cations; X is selected from the group consisting of the methylene radical

the α-hydroxymethylene radical

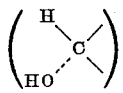

the β-hydroxymethylene radical

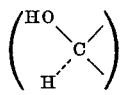

and the carbonyl radical

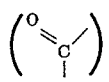

Z is selected from the group consisting of

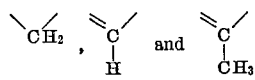

with the proviso that when Z is selected from the group consisting of

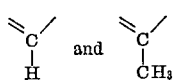

the stereoconfiguration at $C_3$ is β-, but when Z is $CH_2$ the stereoconfiguration at $C_3$ is selected from the group consisting of α- and β-, whereupon the stereoconfiguration of the hydrogen atom at $C_5$ is selected from the group consisting of α- and β-.

2. A compound of claim 1, wherein R is represented by Ac, the acyl radical of a hydrocarbon carboxylic acid containing from one to twelve carbon atoms, inclusive, R' is selected from the group consisting of hydrogen, lower alkyl and pharmacologically acceptable salt cations, X is

and Z is

said compound having the formula

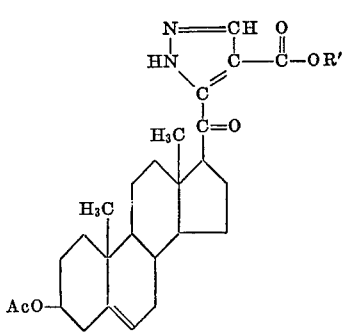

3. A compound of claim 1 wherein R is acetyl, R is methyl, X is

and Z is

namely, 17β - (4 - carboxypyrazol - 5 - ylcarbonyl)-androst-5-en-3β-ol, acetate, methyl ester of the formula

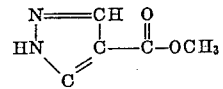

4. A compound of claim 1 wherein R is hydrogen, R' is methyl, X is

and Z is

namely, 17β - (carboxypyrazol - 5 - ylcarbonyl) - androst-5-en-3β, methyl ester of the formula

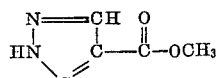

5. A compound of claim 1 wherein R and R' are hydrogen, X is

and Z is

namely, 17β - (4 - carboxypyrazol - 5 - ylcarbonyl)-androst-5-en-3β-ol of the formula

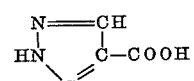

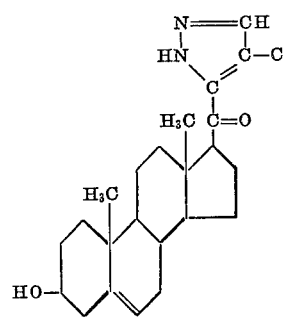

6. 17β - (4 - carboxy - 4 - acetoxy - 4,5 - dihydropyrazol - 5 - ylcarbonyl) - androst - 5 - en - 3β - ol, acetate, methyl ester of the formula

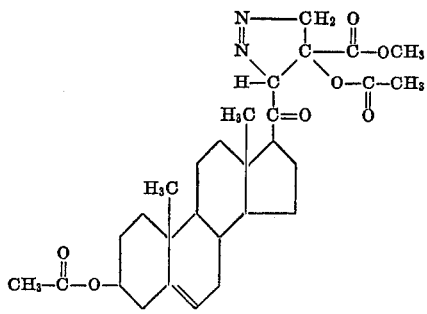

7. 17β - (4 - carboxy - 1 - methylpyrazol - 5 - ylcarbonyl)-androst-5-en-3β-ol, acetate, methyl ester of the formula

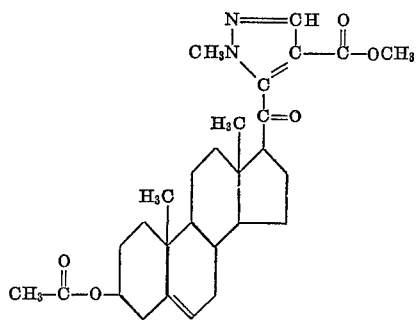

8. A process for the production of a compound of claim 1 having the Formula IV

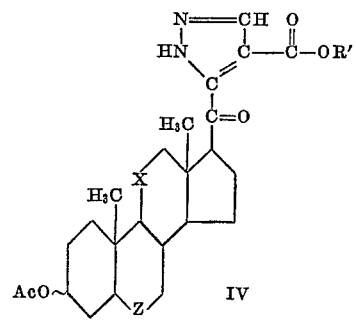

wherein ~ is a generic expression denoting α- and β- bonds and mixtures thereof; Ac is the acyl radical of an organic carboxylic acid containing from one to twelve carbon atoms, inclusive, R' is selected from the group consisting of hydrogen, lower alkyl and pharmacologically acceptable salt cations; X is selected from the group consisting of the methylene radical

the α-hydroxymethylene radical

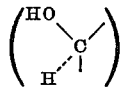

the β-hydroxymethylene radical

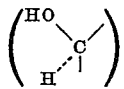

and the carbonyl radical

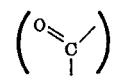

Z is selected from the group consisting of

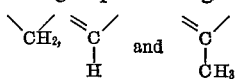

with the proviso that when Z is selected from the group consisting of

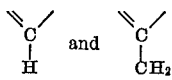

the stereoconfiguration at $C_3$ is β-, but when Z is

the stereoconfiguration at $C_3$ is selected from the group consisting of α- and β-, whereupon the stereoconfiguration of the hydrogen atom at $C_5$ is selected from the group consisting of α- and β-, which comprises:

(1) subjecting to glyoxalation at the 21-position as corresponding compound of the Formula I

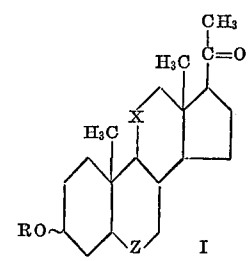

wherein R is selected from the group consisting of hydrogen and the lower acyl radical of an organic carboxylic acid containing from one to twelve carbon atoms, inclusive, and X and Z have the same meaning as above, to yield a corresponding compound of the Formula II

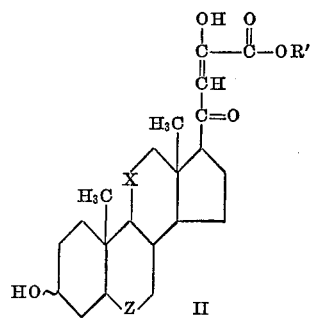

wherein ~, R', X and Z have the same meaning as above;

(2) subjecting to enol acylation at the 3- and 21-positions a thus produced corresponding compound of Formula II to yield a corresponding compound of the Formula III

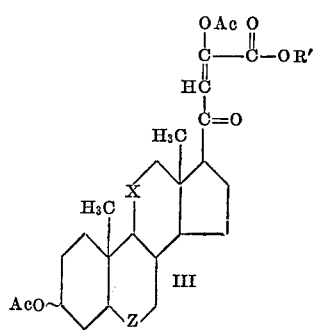

wherein ~, Ac, R', X and Z have the same meaning as above:

9. A process for the production of the compound of
(3) treating with diazomethane a thus produced corresponding compound of Formula III to yield a corresponding compound of Formula IV, above.
claim 1 having the Formula IV

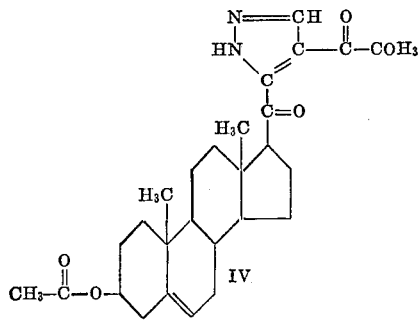

which comprises:
(1) treating with sodium methoxide, methanol and dimethyl oxalate a compound of the Formula I

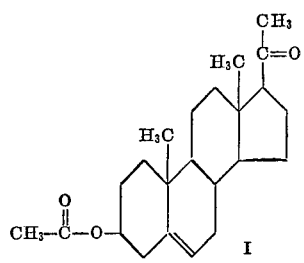

to yield a compound of the Formula II

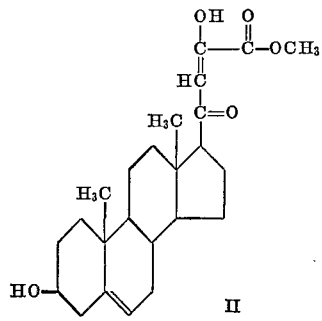

(2) treating the thus produced compound of Formula II with acetic anhydride and pyridine to yield the compound of the Formula III

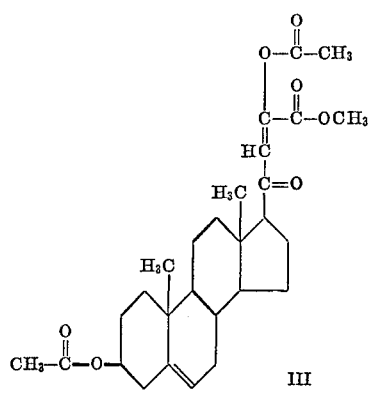

(3) treating with diazomethane the thus produced compound of Formula III to yield the compound of Formula IV, above.

10. A process for the production of a compound of claim 1 having the Formula IV

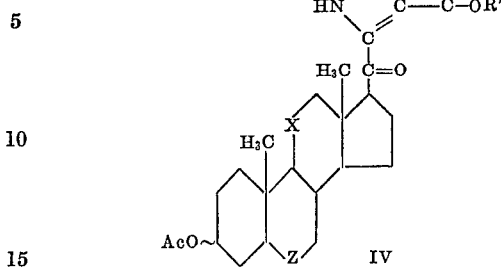

wherein ~ is a generic expression denoting α- and β-bonds and mixtures thereof; Ac is the acyl radical of an organic carboxylic acid containing from one to twelve carbon atoms, inclusive; R' is selected from the group consisting of lower alkyl and pharmacologically acceptable salt cations; X is selected from the group consisting of the methylene radical

the α-hydroxymethylene radical

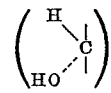

the β-hydroxymethylene radical

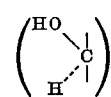

and the carbonyl radical

Z is selected from the group consisting of

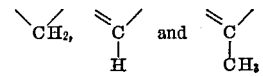

with the proviso that when Z is selected from the group consisting of

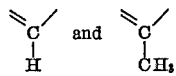

the stereo- at $C_3$ is β-, but when Z is

the stereoconfiguration at $C_3$ is selected from the group consisting of α- and β-, whereupon the stereoconfiguration of the hydrogen atom at $C_5$ is selected from the group consisting of α- and β-, which comprises:
(1) subjecting to enol acylation at the 3- and 21-positions a corresponding compound of the Formula II

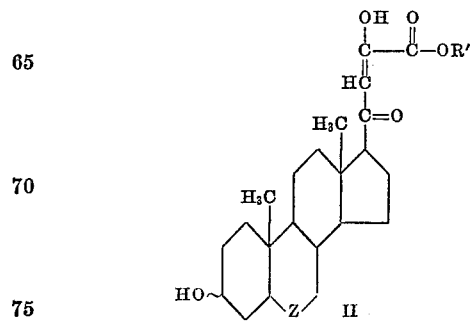

wherein ~, R', X and Z have the same meaning as above, to yield a corresponding compound of the Formula III

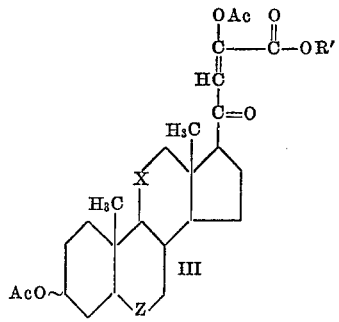

wherein ~, Ac, R', X and Z have the same meaning as above;

(2) treating with diazomethane a thus produced corresponding compound of Formula III to yield a corresponding compound of Formula IV, above.

11. A process for the production of the compound of claim 1 having the Formula IV

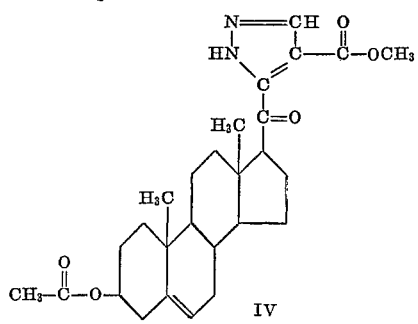

which comprises:
(1) treating the compound of the Formula II

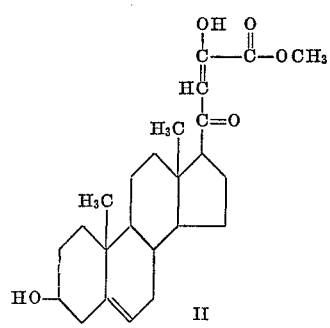

with acetic anhydride and pyridine to yield the compound of the Formula III

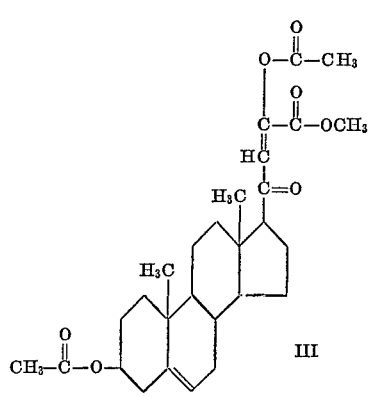

(2) treating the thus produced compound of Formula III with diazomethane to yield the compound of Formula IV, above.

12. A process for production of a compound of claim 1 having the Formula IV

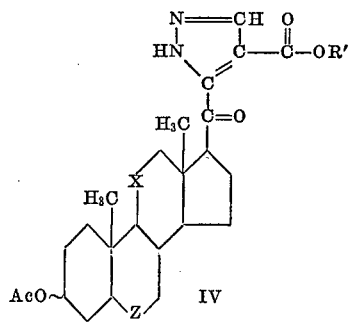

wherein ~ is a generic expression denoting α- and β-bonds and mixtures thereof; Ac is the acyl radical of an organic carboxylic acid containing from one to twelve carbon atoms, inclusive; R' is selected from the group consisting of lower alkyl and pharmacologically acceptable salt cations; X is selected from the group consisting of the methylene radical

the α-hydroxymethylene radical

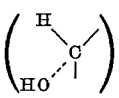

the β-hydroxymethylene radical

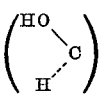

and the carbonyl radical

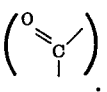

Z is selected from the group consisting of

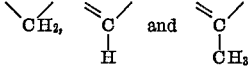

with the proviso that when Z is selected from the group consisting of

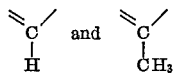

the stereoconfiguration at $C_3$ is β-, but when Z is

the stereoconfiguration at $C_3$ is selected from the group consisting of α- and β, whereupon the stereoconfiguration of the hydrogen atom at $C_5$ is selected from the group consisting of α- and β, which comprises:

treating with diazomethane a corresponding compound of the Formula III

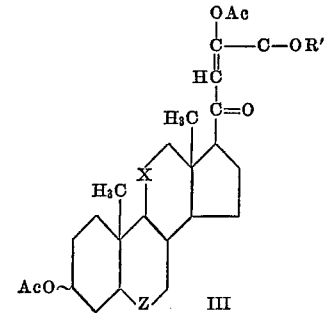

wherein ~, Ac, R', X and Z have the same meaning as above.

13. A process for the production of a compound of the Formula V

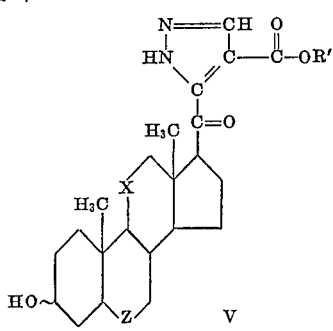

wherein ~ is a generic expression denoting α- and β-bonds and mixtures thereof; R' is selected from the group consisting of lower alkyl and pharmacologically acceptable salt cations; X is selected from the group consisting of the methylene radical

the α-hydroxymethylene radical

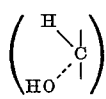

the β-hydroxymethylene radical

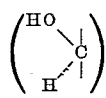

and the carbonyl radical

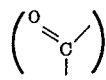

Z is selected from the group consisting of

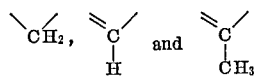

with the proviso that when Z is selected from the group consisting of

and

the stereoconfiguration at $C_3$ is β-, but when Z is

the stereoconfiguration at $C_3$ is selected from the group consisting of α and β-, whereupon the stereoconfiguration of the hydrogen atom at $C_5$ is selected from the group consisting of α- and β-, which comprises treating with acid in an alkanol a corresponding compound of the Formula IV

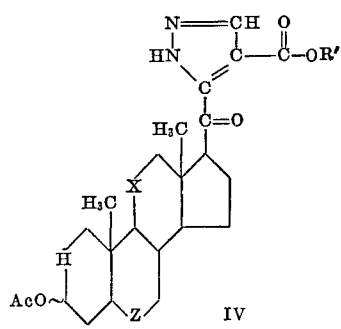

wherein Ac is the acyl radical of an organic carboxylic acid containing from one to twelve carbon atoms, inclusive, and ~, R', X and Z have the same meaning as above.

14. A process for the production of a compound of the Formula VI

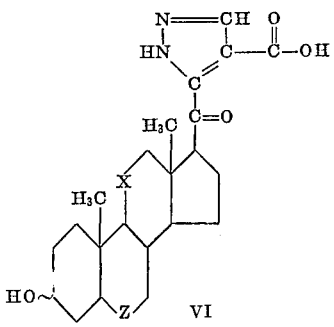

wherein ~ is a generic expression denoting α- and β-bonds and mixtures thereof; X is selected from the group consisting of the methylene radical

the α-hydroxymethylene radical

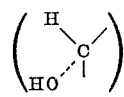

the β-hydroxymethylene radical

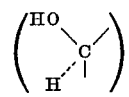

and the carbonyl radical

Z is selected from the group consisting of

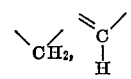

and

with the proviso that Z is selected from the group consisting of

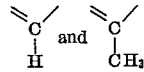

the stereoconfiguration at $C_3$ is β-, but when Z is

the stereoconfiguration at $C_3$ is selected from the group consisting of α- and β-, whereupon the stereoconfiguration of the hydrogen atom at $C_5$ is selected from the group consisting of α- and β-, which comprises treating with an inorganic base in an organic solvent a corresponding compound of the Formula IV

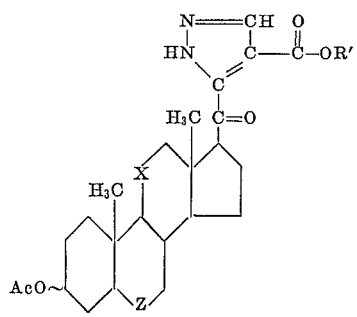

wherein Ac is the acyl radical of an organic carboxylic acid containing from one to twelve carbon atoms, inclusive; R' is selected from the group consisting of lower alkyl and pharmacologically acceptable salt cations; ∼, X and Z have the same meaning as above.

15. A process for the production of a compound of the formula

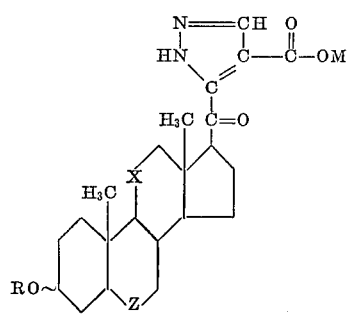

wherein ∼ is a generic expression denoting α- and β-bonds and mixtures thereof; R is selected from the group consisting of hydrogen and the acyl radical of a hydrocarbon carboxylic acid containing from one to twelve carbon atoms, inclusive; M is selected from the group consisting of the pharmacologically acceptable salt cations sodium, potassium and ammonium; X is selected from the group consisting of the methylene radical

the α-hydroxymethylene radical

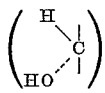

the β-hydroxymethylene radical

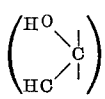

and the carbonyl radical

Z is selected from the group consisting of

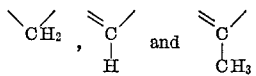

with the proviso that when Z is selected from the group consisting of

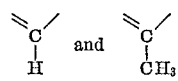

the stereoconfiguration at $C_3$ is β-, but when Z is

the stereoconfiguration at $C_3$ is selected from the group consisting of α- and β-, whereupon the stereoconfiguration of the hydrogen atom at $C_5$ is selected from the group consisting of α- and β-, which comprises suspending in water and adding a base selected from the group consisting of sodium, hydroxide, potassium hydroxide and ammonium hydroxide a corresponding compound of the formula

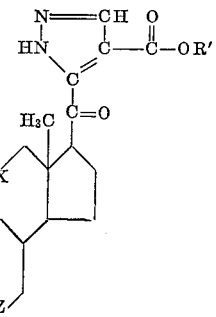
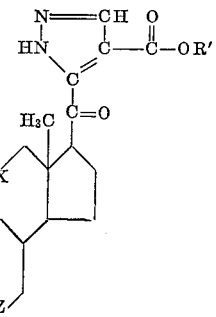

wherein R' is selected from the group consisting of hydrogen and the lower alkyl, and ∼, R, X and Z have the same meaning as above.

16. A process for the production of the compound of claim 1 having the Formula IV

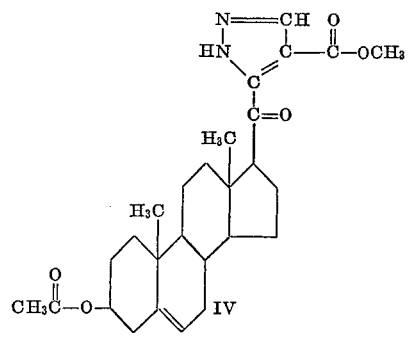

which comprises treating the compound of the Formula III

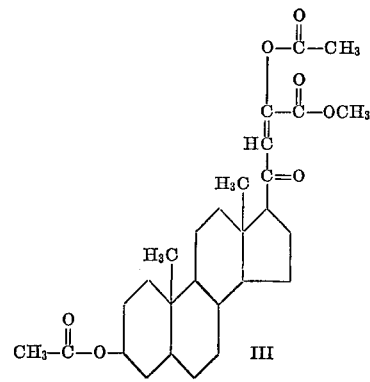

with diazomethane.

References Cited

UNITED STATES PATENTS 3,328,387   6/1967   Meyer et al.

HENRY A. FRENCH, *Primary Examiner.*

U.S. Cl. X.R.

260—397.4, 397.45, 397.47; 424—241